KNOCKOUT MASK DETECTOR IN SCANNER APPARATUS

Filed May 15, 1963 3 Sheets-Sheet 1

INVENTORS
ROY H. HUGHES &
RONALD F. CHANNING
BY
Brumbaugh, Free, Graves & Donohue
their ATTORNEYS Sept. 27, 1966 R. H. HUGHES ETAL 3,275,741

KNOCKOUT MASK DETECTOR IN SCANNER APPARATUS

Filed May 15, 1963 3 Sheets-Sheet 2

INVENTORS
ROY H. HUGHES &
RONALD F. CHANNING
BY
Brumbaugh, Free, Graves & Donohue
their ATTORNEYS

KNOCKOUT MASK DETECTOR IN SCANNER APPARATUS

Filed May 15, 1963 3 Sheets-Sheet 3

INVENTORS
ROY H. HUGHES &
RONALD F. CHANNING
BY
Brumbaugh, Free, Graves & Donohue
their ATTORNEYS United States Patent Office 3,275,741
Patented Sept. 27, 1966

3,275,741
KNOCKOUT MASK DETECTOR IN SCANNER APPARATUS

Roy H. Hughes, Church Crookham, and Ronald F. Channing, London, England, assignors to Time Incorporated, New York, N.Y., a corporation of New York
Filed May 15, 1963, Ser. No. 280,544
13 Claims. (Cl. 178—5.2)

This invention relates to scanner apparatus for analyzing color images point by point and producing color separation images and, more particularly, to a new and improved detecting arrangement for detecting a knockout mask superimposed on the color image being analyzed and controlling the reproduction of the masked areas in the separation images.

Frequently, when color separation images are being prepared, it is necessary to eliminate selected portions of the original image from the separation images so that lettering or other non-image information can be introduced into the final print. For this purpose, the selected portions of the original color image are covered with a layer of opaque material so as to form a "knockout mask."

In conventional scanner apparatus wherein the original image is scanned by photoelectric devices sensitive to various colors and the resulting electric signals control corresponding glow lamps to expose light sensitive materials, detection of the edge of a knockout mask by the photoelectric devices causes the exposure control signals to drop out so as to eliminate those parts of the image. Before this drop out can occur, however, the edge of the mask must be detected and in some cases this may result in an outline around the selected masked areas in the final print.

Accordingly, it is an object of the present invention to provide a new and improved mask detector in scanner apparatus which effectively overcomes the above-mentioned disadvantages of present scanner systems.

Another object of the present invention is to provide a mask detecting arrangement which permits selective generation of color signals in the masked areas of the image.

These and other objects of the invention are attained by providing, in scanner apparatus including means for scanning an original image with a beam of light, photoelectric image detecting means responsive to the beam of light as modified by the image for detecting brightness characteristics of the image point by point, and a plurality of variable intensity light source elements for generating corresponding color separation images point by point in accordance with the image brightness, a system for detecting extreme brightness conditions in the modified light beam from the original image and operating the light sources at extreme levels in their ranges of operation in response to detection of such conditions. In one embodiment the detecting system comprises means for detecting the brightness characteristics of the beam at a location adjacent to and in advance of the point being scanned and this embodiment preferably includes an arrangement for delaying the restoration of the light intensities to values within the normal range of operation following the detection of the trailing edge of the mask. Another embodiment of the invention utilizes a detecting arrangement responsive to the brightness characteristics of the beam from the image at the point being scanned. In either embodiment the various light sources may be set to operate at opposite extreme intensity levels so as to produce selected colors in the masked areas in the final print.

Further objects and advantages of the invention will be apparent from a reading of the following description in conjunction with the accompanying drawings, in which.

Figure 1:
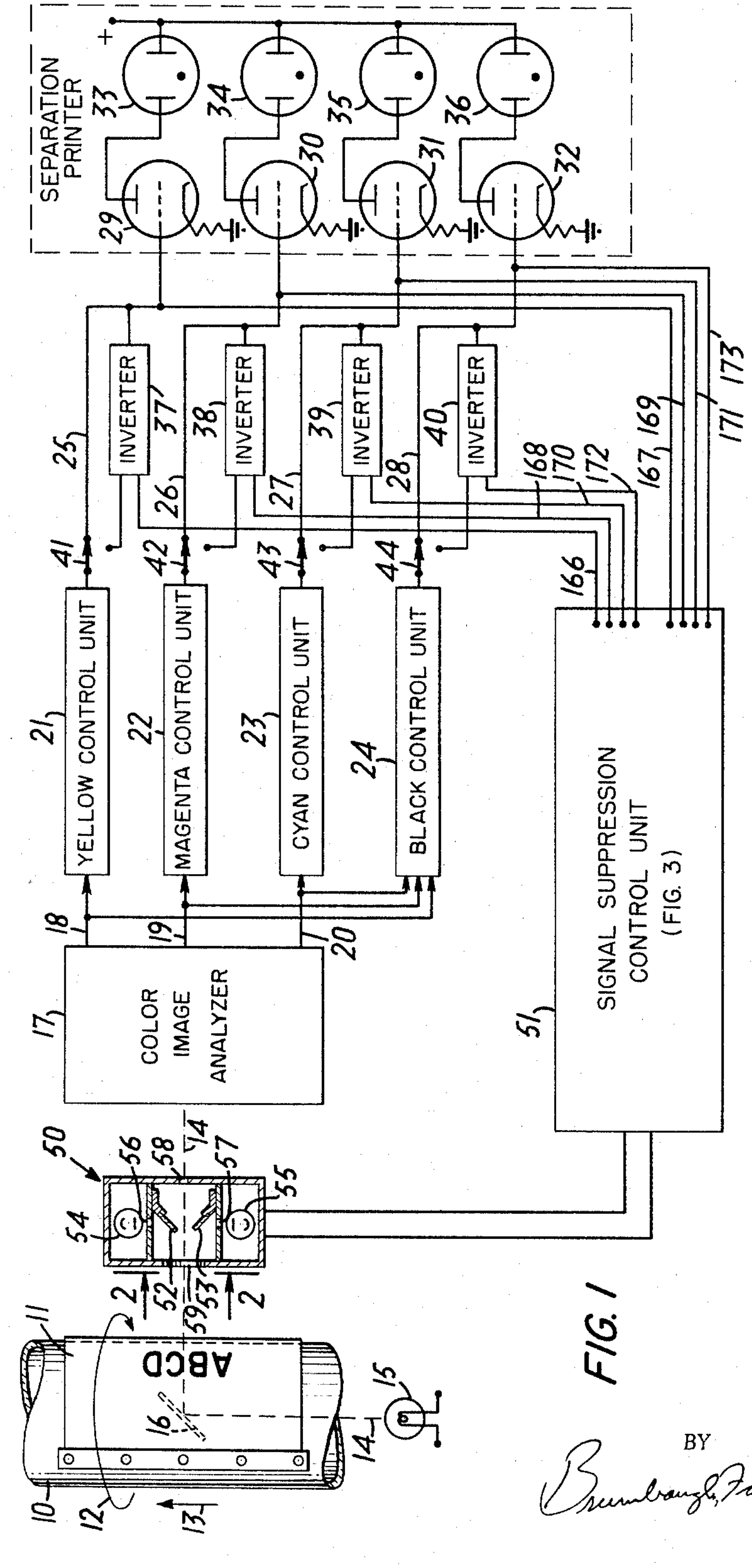
FIG. 1 is a schematic block diagram representing a typical scanner apparatus incorporating one embodiment of a mask detecting arrangement according to the present invention.

In the embodiment of the invention illustrated in FIG. 1, a transparent drum 10 carrying a color transparency 11 is rotated in the direction indicated by the arrow 12 and also moved in the axial direction as shown by the arrow 13 so that a beam of light 14 from a source 15, after reflection by an internal mirror 16, scans the entire transparency image point by point. As in conventional scanning apparatus, a color image analyzing unit 17 receives the beam of light 14 and divides it into three selected color components which are applied to three corresponding internal photoelectric devices (not shown) so as to generate electrical signals which instantaneously represent the brightness of the corresponding color component at the point in the transparency which intercepts the beam 14 at that instant.

These three electrical signals, carried by corresponding conductors 18, 19 and 20, are applied to corresponding yellow, magenta and cyan signal control units 21, 22 and 23, which perform various corrective functions such as compression, color masking, etc., in a manner well known to those skilled in the art so that the final color print produced from the separation images will have the desired characteristics. In addition, all three of these signals are applied to a black control unit 24 which derives electrically a black printer signal for four-color work utilizing the undercolor removal principle. This unit may, for example, be arranged as described in the United States patent to Hall, No. 2,892,016.

From the four control units, 21–24, corresponding output conductors 25, 26, 27, and 28 carry the signals to four glow lamp driver tubes 29, 30, 31 and 32 connected to control the intensities of four conventional glow lamps 33, 34, 35 and 36, the glow lamps being arranged in the usual manner to illuminate separate sheets of photoographic film (not shown) so as to provide the color separation images. Generally, conventional scanner systems are arranged to produce increasing glow lamp intensities for increasing brightness of the corresponding color components in the transparency 11 so that a positive transparency will produce negative images on the separation film sheets. If desired, however, positive separation images may be produced from an original positive image by including four signal inverter units 37, 38, 39 and 40, one in each channel, which may be connected to the corresponding control units by switches 41, 42, 43 and 44. These inverters may, for example, be of the type described in the United States application of William West Moe, Serial No. 176,244, filed February 28, 1962 for "Direct Positive Printer for Color Film Analyzer." As thus far described, the scanner apparatus is well known to those skilled in the art and need not be set forth in greater detail.

According to one form of the present invention, the scanner apparatus also includes a mask detector unit 50 arranged to detect the extremely low brightness condition produced by a knockout mask on the transparency 11 immediately before it is detected by the color image analyzer 17, along with a signal suppression unit 51 which responds to mask detection to drive the glow lamps 33–36 to either minimum intensity or maximum intensity, depending on the settings of the various controls in the unit, and to maintain the extreme glow lamp operating conditions until the mask no longer intercepts the beam passing into the analyzer 17. To this end, the detector unit 50 comprises two mirrors 52 and 53, located one on either side of the center of the beam 14 as it passes toward the analyzer 17, and two photoelectric tubes 54 and 55, each positioned to receive light reflected by the corresponding mirror after passing through corresponding apertures 56 and 57. It will be understood, of course, that the mask detecting unit 50 may be included in the color image analyzer 17, rather than being a separate unit as shown in FIG. 1.

Figure 2:
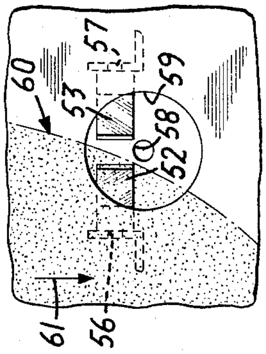
FIG. 2 is an enlarged fragmentary sectional view taken on the lines 2—2 of FIG. 1 and looking in the direction of the arrows.

As best seen in the side view of the unit 50 shown in FIG. 2, wherein the opening 58 represents an aperture at the far side of the unit 50 defining the limits of the beam 14 as received by the analyzer 17, and the opening 59 indicates a larger aperture in the near side of the unit 50, the mirrors 52 and 53 are located one on each side of the axis of the beam passing through the aperture 58 and also slightly above the axis of that beam, the scanning motion of the trannsparency being downward, as viewed in FIG. 2. In this way, any masked portion of the transparency is detected by one of the mirrors 52 and 53 before it passes over the aperture 58 during rotation of the drum 10 because of the displacement of the mirrors with respect to the aperture 58 in the direction of drum rotation. Moreover, because of the displacement of the two mirrors in opposite lateral direction of the aperture 58, any mask edge which extends in a direction almost parallel to the direction of scanning motion is likewise detected before it intercepts the portion of the light beam passing through the scanning aperture 58. This is illustrated in the particular example shown in FIGS. 1 and 2, wherein the masked portion of the original image is in the form of four letters, A, B, C and D. As shown in FIG. 2, the shaded portion 60 represents the shadow of the central area of the letter C as it moves in the direction of the arrow in FIG. 2 upon rotation of the drum 10. In this case, the mirror 52 intercepts the mask shadow before it passes over the aperture 58 even though the edge of the mask is nearly parallel to the direction of motion of the image. Accordingly, it will be apparent that regardless of the shape of a mask, the edge of the mask approaching the aperture 58 must pass across one of the other of the mirrors 52 and 53 before it passes across the aperture 58, thereby actuating the signal suppression unit 51 before a corresponding signal can be applied to the conductors 18, 19 and 20 by the analyzer 17.

Figure 3:
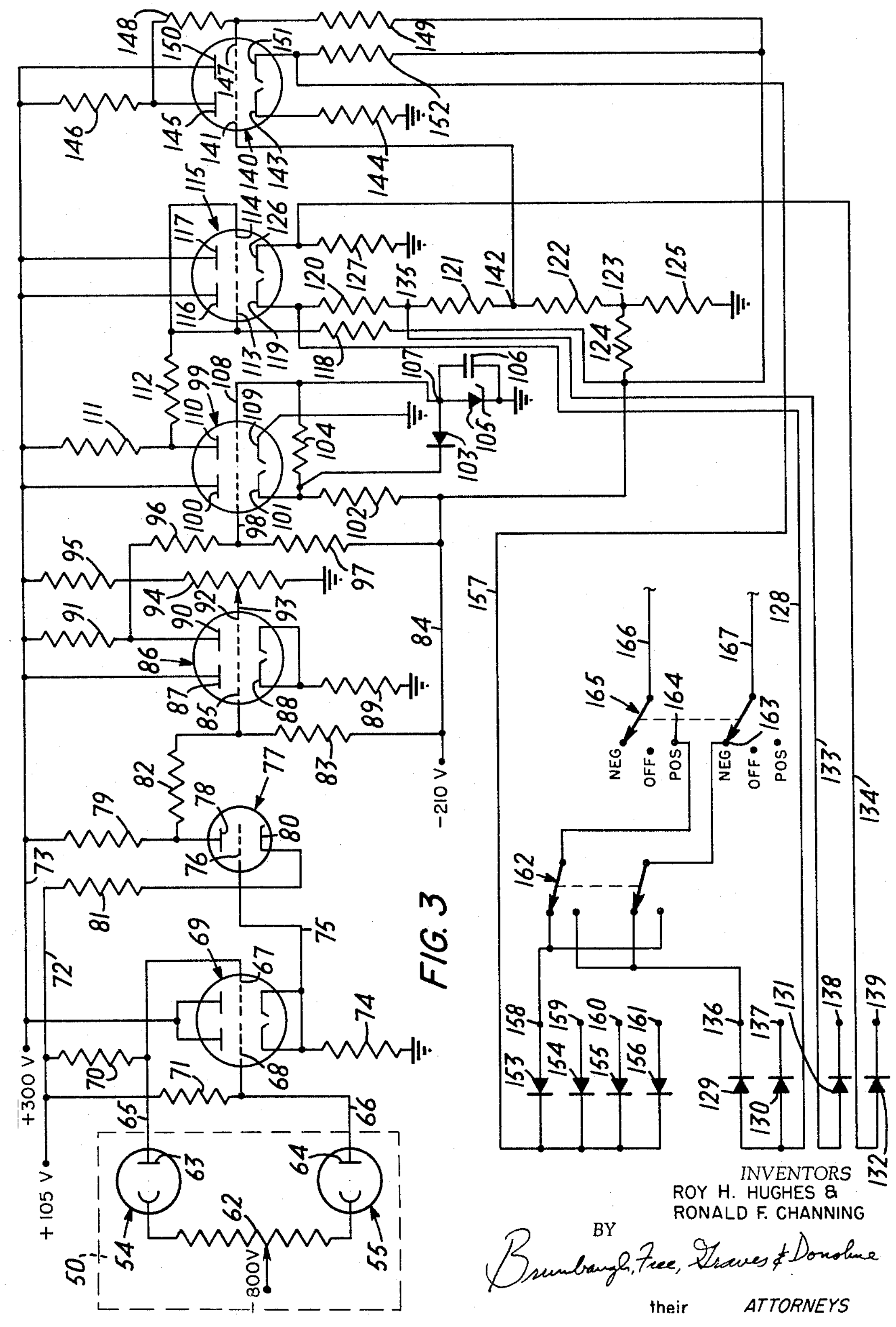
FIG. 3 is a schematic electrical circuit diagram of the signal suppression control unit shown in FIG. 1.

In the typical signal suppression unit shown in FIG. 3, the two photocells 54 and 55, which may be photomultipliers of the type designated 931A, for example, have cathode electrodes connected through a balancing resistor 62 to a negative high voltage source, and plate output electrodes 63 and 64 connected by conductors 65 and 66 to the grid electrodes 67 and 68 of a dual amplifier tube 69 and also through identical resistors 70 and 71 to a 105 volt positive line 72. The tube 69 may, for example, be of the 5751 type, having common plate electrodes connected to a 300 volt positive line 73 and common cathode electrodes connected through a load resistor 74 to ground. Consequently, as long as both of the photomultipliers are illuminated, both halves of the amplifier are biased off and the cathodes remain at a low potential. Whenever either of the photomultipliers is not illuminated, however, the corresponding half of the dual amplifier conducts, drawing current through the resistor 74 and raising the common cathode voltage.

This voltage is applied by a conductor 75 to the grid elctreode 76 of another amplifier 77 which may comprise one-half of a 5814 type tube, for example, the plate electrode 78 thereof being connected through a resistor 79 to the 300 volt positive line 73 and the cathode 80 being joined by a resistor 81 to the 105 volt positive line 72. The resistor 79, along with two further series resistors 82 and 83, comprises a voltage divider connected between the 300 volt positive line 73 and a 210 volt negative line 84 and, from the junction between the resistors 82 and 83, the output of the amplifier 77 is applied to the grid electrode 85 of a further amplifier comprising one-half of a type 5751 tube 86 having a plate electrode 87 held at 300 volts and a cathode electrode 88 connected in common with the other cathode of the tube through a register 89 to ground. The values of the resistors 79, 82 and 83 are selected so that this half of the tube 86 normally conducts, holding the common cathode voltage at a selected level but, when one of the photocells 54 and 55 is darkened, operation of the tube 77 reduces the voltage at the grid 85, thereby reducing the common cathode voltage. The other half of the tube 86 includes a plate electrode 90 connected through a load resistor 91 to the line 73 and a grid electrode 92 connected to the movable tap 93 of a potentiometer 94 joined at one end to ground and at the other end through a resistance 95 to the positive line 73. Consequently, the current drawn through this side of the tube 86 increases by reason of the reduced cathode voltage whenever the illumination of one of the photocells falls off, thereby decreasing the voltage at the plate electrode 90, and the setting of the tap 93 can be adjusted so that this voltage is at a selected minimum value when the illumination of either photocell falls below a given minimum level.

Two resistors 96 and 97 are connected in series between the plate electrode 90 and the negative conductor 84 and the junction between these resistors is connected to the grid electrode 98 of a cathode follower comprising one-half of another 5751 type dual tube 99 including a plate electrode 100 connected to the 300 volt positive line and a cathode electrode 101 connected to the line 84 through a resistor 102. In addition, a diode rectifier 103 of the HS1007 type, shunted by a resistor 104, is connected in series with a 15 volt zener diode 105 between the cathode 101 and ground and a 0.005 mocrofarad capacitor 105 is connected across the zener diode. The two diodes 103 and 105 are oriented with their anodes joined together and this junction 107 is connected to the grid electrode 108 of the amplifier comprising the other half of the tube 99, the cathode electrode 109 being grounded and the plate electrode 110 being connected to the line 73 through a resistor 111.

With this arrangement, whenever the voltage at the plate 90 falls to the selected minimum value, the voltage at the grid electrode 98 is likewise reduced, causing the cathode 101 to become increasingly negative and, when this voltage is more than 15 volts negative, the diodes 103 and 105 conduit, holding the cathode at that level and likewise maintaining the grid electrode 108 at 15 volts negative so that no current flows through the corresponding half of the tube 99. Furthermore, when the cathode 101 becomes positive again after both the photocells have been reilluminated, the grid 108 is held negative for a short time, of the order of a millisecond, by the 15 volt negative charge on the capacitor 106 until that charge has been released through the resistor 104. This relay allows sufficient time for the trailing edge of the mask to pass over the aperture 58 (FIG. 2) before the signal from the analyzer 17 is rendered effective to control the glow lamps and the exact value of this delay can be adjusted by changing the capacitance of the capacitor 106.

To control the glow lamps 33–36 in accordance with the voltage at the plate electrode 110 during the time either of the photocells is masked and for the short delay period thereafter, a resistor 112 connects the electrode 110 to both the grid electrodes 113 and 114 of a dual tube 115 which may be of 6201 type, having both plate electrodes 116 and 117 connected to the 300 volt positive line 73, the grid electrodes 113 and 114 also being joined to the 210 volt negative line 84 through a resistor 118. Because the four glow lamps 33–36 and their drive tubes 29 to 32 may have somewhat different operating conditions by reason of the different characteristics desired in the separation images to be produced thereby, it may be necessary to generate slightly different control signals for the glow lamps during the mask detection time. In the typical embodiment of the invention described herein, this is accomplished by connecting one cathode electrode 119 in the tube 115 through three series resistors 120, 121 and 122 to the junction 123 between two series resistors 124 and 125 connected between the 210 volt negative line 84 and ground. The other cathode electrode 126 in the tube 115 is joined to ground through a resistor 127.

From the cathode electrode 119, a conductor 128 leads to the anodes of two diode rectifiers 129 and 130 which may be of 1N215 type, for example. Likewise, two further diodes 131 and 132 have their anodes connected by conductors 133 and 134 to the junction 135 between the resistors 120 and 121 and to the cathode electrode 126, respectively. The cathodes of the diodes 129 to 132 are connected to four terminals 136 to 139 for controlling negative masking of the yellow, magenta, cyan and black separation prints, respectively.

To provide positive masking, a further dual tube 140 of the 5751 types, for example, has a grid electrode 141 connected to the junction 142 between the resistors 121 and 122 and this side of the tube has its cathode 143 connected to ground through a resistor 144 and its plate electrode 145 connected to the positive line 73 by a load resistor 146. Also, the grid electrode 147 in the other side of this tube is joined to the plate 145 by a resistor 148 and to the negative line 84 by a resistor 149, the corresponding plate electrode 150 being joined to the positive line 73 and the cathode electrode 151 being connected to the negative conductor 84 through a resistor 152. Four diode rectifiers 153–156, which may be similar to the rectifiers 129–132, have their cathodes joined to the cathode 151 by a conductor 157 and their anodes connected to corresponding terminals 158–161.

The terminals 136 and 158 are connected through a reversing switch 162 to the corresponding fixed contacts 163 and 164 in a negative-positive control switch 165 having two output conductors 166 and 167 arranged so that the terminal 136 is joined to the negative conductor 167 when the switch 162 is in its normal position, shown in FIG. 3, and the switch 165 is at the "negative" position and the terminal 158 is unconnected. With the switch 165 at the "positive" position, the conductor 166 is joined to the terminal 158 and the terminal 136 is disconnected. If the switch 162 is moved to its other position, the terminal 158 will be joined to the negative conductor 167, when the switch 165 is at "negative," and the terminal 136 will be joined to the conductor 166 when that switch is at "positive." As shown in FIG. 1, the conductor 167 leads to the control grid of the driver tube 29 for the glow lamp 33 which produces the yellow separation image and the conductor 166 leads to the inverter 37 in that channel. For convenience, the connections between the remaining terminals 137–139 and 159–161 have not been illustrated in the drawings, but it will be understood that switches arranged identically to the switches 162 and 165 are included between these terminals and corresponding conductors 168–173 which are shown in FIG. 1.

Accordingly, if neither of the photocells 54 and 55 is covered by any part of a mask and if the capacitor 106 is not charged as a result of immediately previous masking so as to maintain the grid 108 negative, then the relatively negative condition of the plate electrode 110 keeps both sides of the tube 115 in the off condition so that the anodes of the diodes 129–131 are approximately 10 volts negative and the anode of the diode 132 is at ground, thereby biasing these diodes to the high impedance condition and having no effect on the operation of the scanning system. If a mask covers either of the two photocells, both sides of the tube 115 conduct, raising the anodes of all of these diodes to approximately 125 volts positive, and with the switches 162 and 165 in the positions illustrated in FIG. 3, the glow lamp driver tubes 29–32 are driven full on causing the glow lamps to operate at maximum intensity and thereby producing maximum density at the corresponding areas in the separation images.

Whenever the tube 115 is not conducting, the plate 150 of the tube 140 draws current causing the cathode 151 to apply approximately 110 volts positive to the cathodes of the diodes 153–156. The anodes of these diodes are so connected to the inverters 37–40 that, when this occurs, they are biased to the high impedance condition. When the mask is detected, however, the corresponding side of the tube 140 is shut off, causing approximately 20 volts negative to be applied to the diodes 153–156 so that they will conduct. Moreover, the negative voltage applied through the inverter to the grids of the glow lamp driver tubes 29–32 reduces the glow lamp current to zero so that the separation images have zero density in the masked areas.

If it is desired to produce a particular color in the masked area of the finished print, the switch 162 in the corresponding yellow, magenta or cyan channel is moved to the position opposite to that shown in the drawing so that, for negatives, that color will be printed positive (i.e. zero density) in the masked areas and, for positives, the color will print negative (i.e. maximum density) in the masked areas.

In a typical signal suppression control unit constructed according to the circuit shown in FIG. 3, the various resistors shown in the drawing had the following values:

| Resistors: | Ohms |
|---|---|
| 62 | 100,000 |
| 70 | 3,300,000 |
| 71 | 3,300,000 |
| 74 | 100,000 |
| 79 | 100,000 |
| 81 | 6,800 |
| 82 | 560,000 |
| 83 | 680,000 |
| 89 | 27,000 |
| 91 | 1,000,000 |
| 94 | 10,000 |
| 95 | 150,000 |
| 96 | 3,300,000 |
| 97 | 4,700,000 |
| 102 | 150,000 |
| 104 | 470,000 |
| 111 | 330,000 |
| 112 | 680,000 |
| 118 | 2,200,000 |
| 120 | 4,700 |
| 121 | 33,000 |
| 122 | 4,700 |
| 124 | 390,000 |
| 125 | 22,000 |
| 127 | 100,000 |
| 144 | 56,000 |
| 146 | 330,000 |
| 148 | 2,200,000 |
| 149 | 4,700,000 |
| 152 | 270,000 |

In operation, as the drum 10 rotates in the direction indicated by the arrow in FIG. 1, the masked portions of the picture area move downwardly toward the light beam 14, as shown by the arrow in FIG. 2. Consequently, the shadow of the mask intercepts either or both of the mirrors 52 and 53 before it passes over the central aperture 58 which leads to the image analyzer 17 and, in so doing, it actuates the signal suppression unit in the manner described above so as to drive the glow lamps 33–36 to either extreme operating condition, depending on the setting of the switches 162 and 165. After the trailing edge of the mask has passed both the mirrors 52 and 53, the glow lamps are kept operating in their extreme conditions for a short time interval by the capacitor 106 so as to allow the aperture 58 to be uncovered by the trailing edge before the system is restored to normal operation.

In certain instances, such as where the black mask contains very fine detail, it may be possible for portions of the beam 14 representing masked areas of the transparency 11 to pass between the mirrors 52 and 53 without being detected by the photocells 54 and 55. Moreover, where fine detail is involved, it may be necessary to eliminate any time differential between detection of the edges of the masked area and the operation of the signal suppression control unit.

Figure 4:
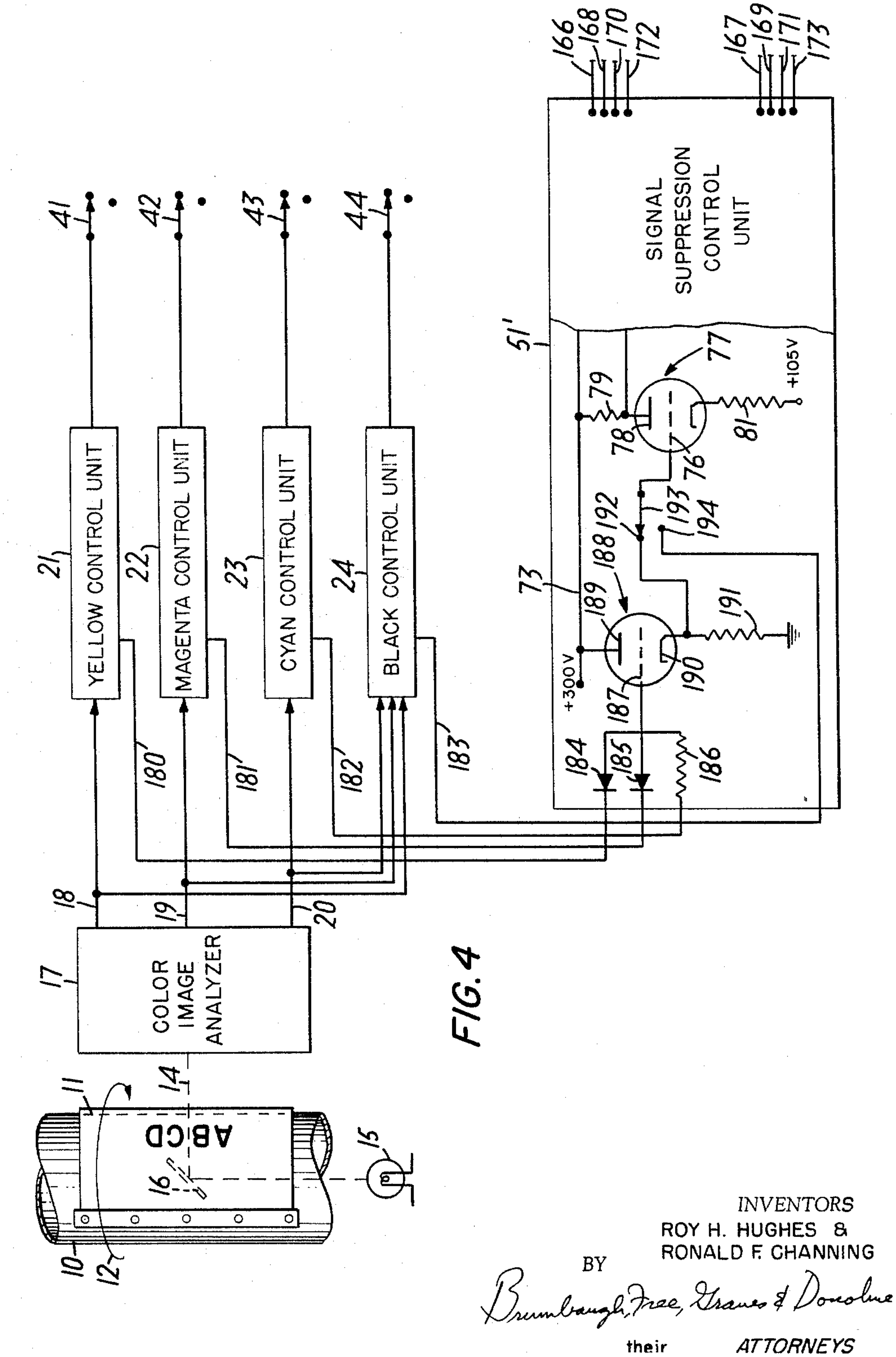
FIG. 4 is a schematic block diagram showing a portion of a scanner system utilizing another mask detecting arrangement according to the invention.

To avoid these difficulties, the embodiment of the invention illustrated in FIG. 4 may be utilized. This embodiment is the same as that shown in FIG. 1 except that detection of the extreme brightness levels representing the masked areas of the transparency 11 is accomplished simultaneously with the scanning of the masked areas, by utilizing signals from the yellow, magenta, cyan and black control units 21–24, rather than detecting extreme brightness levels in advance of scanning. Accordingly, the mask detector unit 50 of FIG. 1 is omitted from the embodiment of FIG. 4 and four conductors 180, 181, 182 and 183 lead from the four control units 21, 22, 23 and 24, respectively, to a modified signal suppression control unit 51′ which is effective to detect extreme brightness conditions. The electrical signals carried by these conductors represent, in the case of the units 21, 22 and 23, the actual image brightness of the corresponding color in the area being scanned, preferably after one or two stages of amplification within the unit, while the signal from the black control unit 24 represents the inverse of the black printer signal derived from the three color signals on the lines 18, 19 and 20 after corresponding amplification. In other words, for minimum voltage on the three conductors 18, 19 and 20, a signal of increased voltage is applied to the line 183.

As shown in FIG. 4, the conductors 180, 181 and 182 are joined through two diode rectifiers 184 and 185 and a resistor 186, respectively, to the grid electrode 187 of a triode 188 within the suppression control unit 51′, the tube 69 of the FIG. 1 embodiment being omitted. The diodes 184 and 185 may be of the HS1007 type, for example, and the resistor 186 may have a value of 1 megohm. Moreover, the triode 188 may comprise, for example, one-half of a dual tube of the 5751 variety, having its plate electrode 189 connected to the 300 volt positive line 73 and its cathode electrode 190 connected to ground through a 100,000 ohm resistor 191. The cathode electrode 190 is also connected to one fixed terminal 192 of a two position switch wherein the movable contact 193 is joined to the grid electrode 76 of the triode 77, the other fixed terminal 194 of this switch being connected to the conductor 183. If desired, to improve the sensitivity of the system to the black mask signal level, an appropriate amplifier (not shown) may be included in the line 183 within the suppression control unit. The only other change required in the suppression control unit 51′ from that of FIG. 1 is that the value of the capacitor 106 (shown in FIG. 3) should be reduced from 0.005 microfarad to 0.0015 microfarad. Otherwise, the entire system is the same as that shown in FIG. 1 and, accordingly, it is not necessary to illustrate the inverters 37–40 or the separation printer of FIG. 1 or the connections therebetween in FIG. 4.

In operation, if the movable contact 193 is connected to the terminal 194, the signal on the line 183 from the black control unit 24 is applied to the grid 76 of the tube 77 and, when even the high density image areas of the transparency 11 are being scanned, this signal has a low enough voltage to prevent the tube 77 from conducting. When the black mask on the transparency 11 intercepts the beam 14, however, an extremely low brightness condition obtains and the signal on the line 183 increases in voltage, causing the tube 77 to conduct. From this point on, the operation of the signal suppression control unit

51′ is identical to that described above with respect to the unit 51 of FIG. 1 and the detailed description thereof need not be repeated.

If the switch contact 193 is moved to the other position, engaging the fixed contact 192, another type of operation is possible. If the original image on the transparency 11 is a photographic copy of an artist's painting on white paper, for example, the unwanted areas or the margin, corresponding to the black masked areas in the operation just described, will have a density in the color image as low as or lower than the lowest density in the image areas of the transparency, permitting the highest brightness extreme in the beam 14 to be transmitted to the analyzer 17 and thus generating a maximum signal in each of the units 21, 22 and 23. The diodes 184 and 185 and the resistor 186 in the lines 180–182 cause the lowest voltage on these three lines to be applied to the grid 187 of the cathode follower 188 so that the suppression control unit 51′ will not operate unless the intensities of all three colors is at the maximum value, thereby preventing operation if a single pure color is detected in the transparency.

In the typical embodiment described herein, the values of the components are selected so that the tube 188 will not conduct until the signals on all three lines 180–182 exceed 70 volts positive, for example, the maximum possible voltage being about 72 or 73 volts. When this condition is present, i.e. maximum image brightness in all three channels producing at least 70 volts on all the conductors 180–182, the tube 188 conducts, increasing the voltage applied to the grid electrode 76 and causing the tube 77 to conduct. The remainder of the operation in this case is also the same as described above with respect to the embodiment of FIG. 1.

Although the invention has been described herein with reference to specific embodiments, many modifications and variations therein will readily occur to those skilled in the art. Accordingly, all such variations and modifications are included within the intended scope of the invention as defined by the following claims.

We claim:

1. In image reproducing apparatus including scanning means for scanning an original brightness image point by point to produce a beam of light containing image brightness information and reproducing means responsive to the beam of light to produce signals representing a corresponding brightness image point by point and including printer means responsive to the signals to generate corresponding brightness image point by point and including means for detecting an extreme brightness condition in the beam of light, and control means responsive to the detecting means for causing the printer means to produce an extreme brightness condition in the corresponding area of the reproduced image, said control means including signal suppression means responsive to detection of an extreme brightness condition by the detector means to suppress signals representing brightness variations and thereby prevent the printer means from reproducing variations in brightness.

2. Image reproducing apparatus according to claim 1 wherein the control means includes means for selectively causing the reproducing means to produce either of two opposite extreme brightness conditions in the reproduced image in response to a given extreme brightness condition in the beam of light.

3. In color image analyzing apparatus including scanning means for scanning an original color image point by point to produce a beam of light containing brightness information and reproducing means responsive to the beam of light for generating corresponding color separation images point by point, detector means for detecting an extreme brightness condition in the beam of light in advance of the response of the reproducing means to the beam of light, and control means responsive to the detecting means for causing the reproducing means to produce an extreme condition of brightness in the corresponding areas of the separation images.

4. Color image analyzing apparatus according to claim 3 wherein the scanning means comprises means for illuminating the original color image, photosensitive means responsive to the brightness of a beam of light from a limited region of the original image and means for providing relative motion between the original color image and the photosensitive means, and wherein the detecting means comprises photosensitive means responsive to the brightness of a portion of the beam of light emanating from a region of the original image which is adjacent to the limited region and in advance thereof in the direction of relative motion.

5. Color image analyzing apparatus according to claim 4 wherein the detecting means comprises two photosensitive means responsive to portions of the beam of light emanating from regions of the original image which are adjacent to the limited region and in advance thereof in the direction of relative motion and also laterally displaced on opposite sides of the limited region with respect to the direction of relative motion.

6. Color image analyzing apparatus according to claim 3 wherein the reproducing means includes variable intensity light source means for producing each of the color separation images and the control means includes means for causing the variable light source means to operate at maximum intensity in response to the detection of an extreme brightness condition in the beam of light by the detecting means.

7. Color image analyzing apparatus according to claim 3 wherein the reproducing means includes variable intensity light source means for producing each of the color separation images and the control means includes means for causing the variable light source means to operate at minimum intensity in response to detection of an extreme brightness condition in the beam of light by the detecting means.

8. Color image analyzing apparatus according to claim 3 wherein the reproducing means includes variable intensity light source means for producing each of the color separation images and the control means includes means for selectively causing each of the variable light source means to operate at either maximum or minimum intensity in response to detection of an extreme brightness condition in the beam of light by the detecting means.

9. Color image analyzing apparatus according to claim 3 including maintaining means for causing the reproducing means to maintain its extreme condition of brightness after the extreme brightness condition in the beam of light has terminated.

10. Color image analyzing apparatus according to claim 9 wherein the maintaining means comprises means providing a selected time delay after termination of the extreme brightness condition in the beam of light before the control means permits restoration of the reproducing means to normal operating condition.

11. In color image analyzing apparatus including scanning means for scanning an original color image point by point to produce a beam of light containing brightness information and reproducing means responsive to the beam of light to produce signals representing corresponding color separation images point by point and including printer means responsive to the signals to generate corresponding brightness images point by point, detector means for detecting an extreme brightness condition in the portion of the beam of light to which the reproducing means is responsive, and control means responsive to the detecting means for causing the printer means to produce an extreme condition of brightness in corresponding areas of separation images, said control means including signal suppression means responsive to detection of an extreme brightness condition by the detector means to suppress signals representing brightness variations and thereby prevent the printer means from reproducing variations in brightness.

12. In a color image analyzing apparatus including scanning means for scanning an original color image point by point to produce a beam of light containing brightness information and reproducing means responsive to the beam of light for generating corresponding color separatioon images point by point, detector means for detecting an extreme brightness condition in the portion of the beam of light to which the reproducing means is responsive, and control means responsive to the detecting means for causing the reproducing means to produce an extreme condition of brightness in corresponding areas of separation images, wherein the reproducing means includes means for generating a plurality of signals representing brightness information for various color components in the beam of light and the detector means includes means responsive only to signals representing extreme brightness conditions of all of the color components simultaneously.

13. Color image analyzing apparatus according to claim 11 wherein the reproducing means includes means for generating a plurality of signals representing brightness information for various color components in the beam of light and means responsive to the plurality of signals to synthesize a black printer signal and the detecting means includes means responsive to the black printer signal.

References Cited by the Examiner

UNITED STATES PATENTS 3,194,883 7/1965 Ross ---------------- 178—5.2

DAVID G. REDINBAUGH, *Primary Examiner.*

J. A. O'BRIEN, *Assistant Examiner.*